INVENTOR.
Floyd I. Dully
BY
W. S. Pettigrew
ATTORNEY

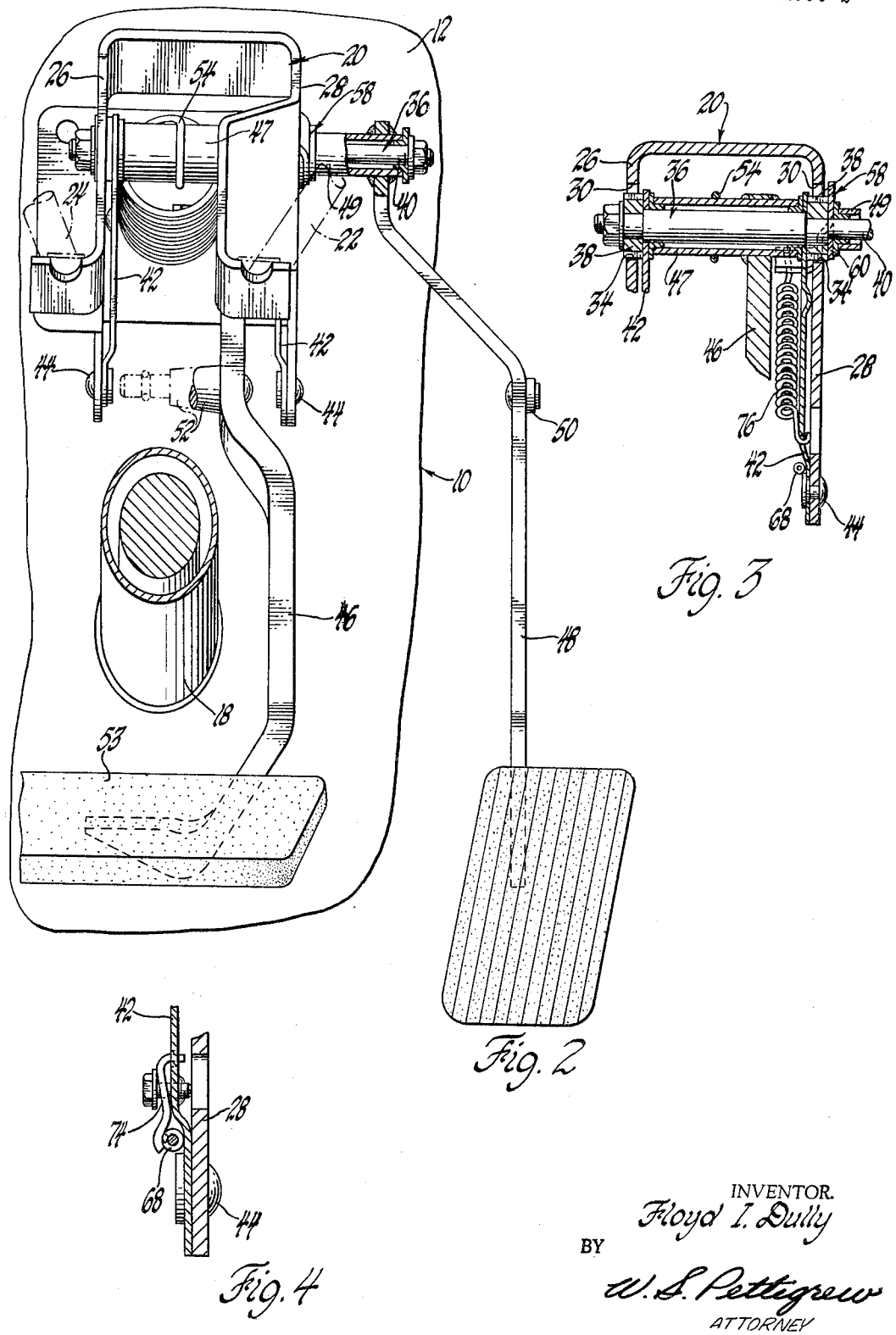

United States Patent Office 3,282,125
Patented Nov. 1, 1966

3,282,125
VEHICLE CONTROL PEDALS
Floyd I. Dully, Detroit, Mich., assignor to General Motors Corporation, Detroit, Mich., a corporation of Delaware
Filed Dec. 23, 1963, Ser. No. 332,603
3 Claims. (Cl. 74—560)

This invention relates to vehicle control pedals and more particularly to adjustable vehicle control pedals.

One feature of this invention is that it provides an improved vehicle control pedal arrangement wherein the pedals are adjustable with respect to the operator. Another feature of this invention is that the control pedals are swingably mounted on adjustable support means and are movable as a unit with the support means about a fulcrum provided at the connection between a pedal and the mechanism which the pedal operates. A further feature of this invention is that releasable holding means are provided to selectively hold or release the support means so that forces applied to an operating portion of the pedal while holding the support means stationary relative to the vehicle body moves the pedal to operate the mechanism, and forces applied to the operating portion of the pedal while releasing the support means for movement relative to the body moves the pedal and support means as a unit relative to the body to provide for adjustment of the pedal with respect to the operator.

These and other features and advantages of this invention will be readily apparent from the following specification and drawings wherein:

FIGURE 2 is a partially broken away elevational view;

FIGURE 3 is a sectional view taken generally along the plane indicated by the line 3—3 of FIGURE 1; and FIGURE 4 is an enlarged sectional view taken generally along the plane indicated by the line 4—4 of FIGURE 1.

Figure 1:
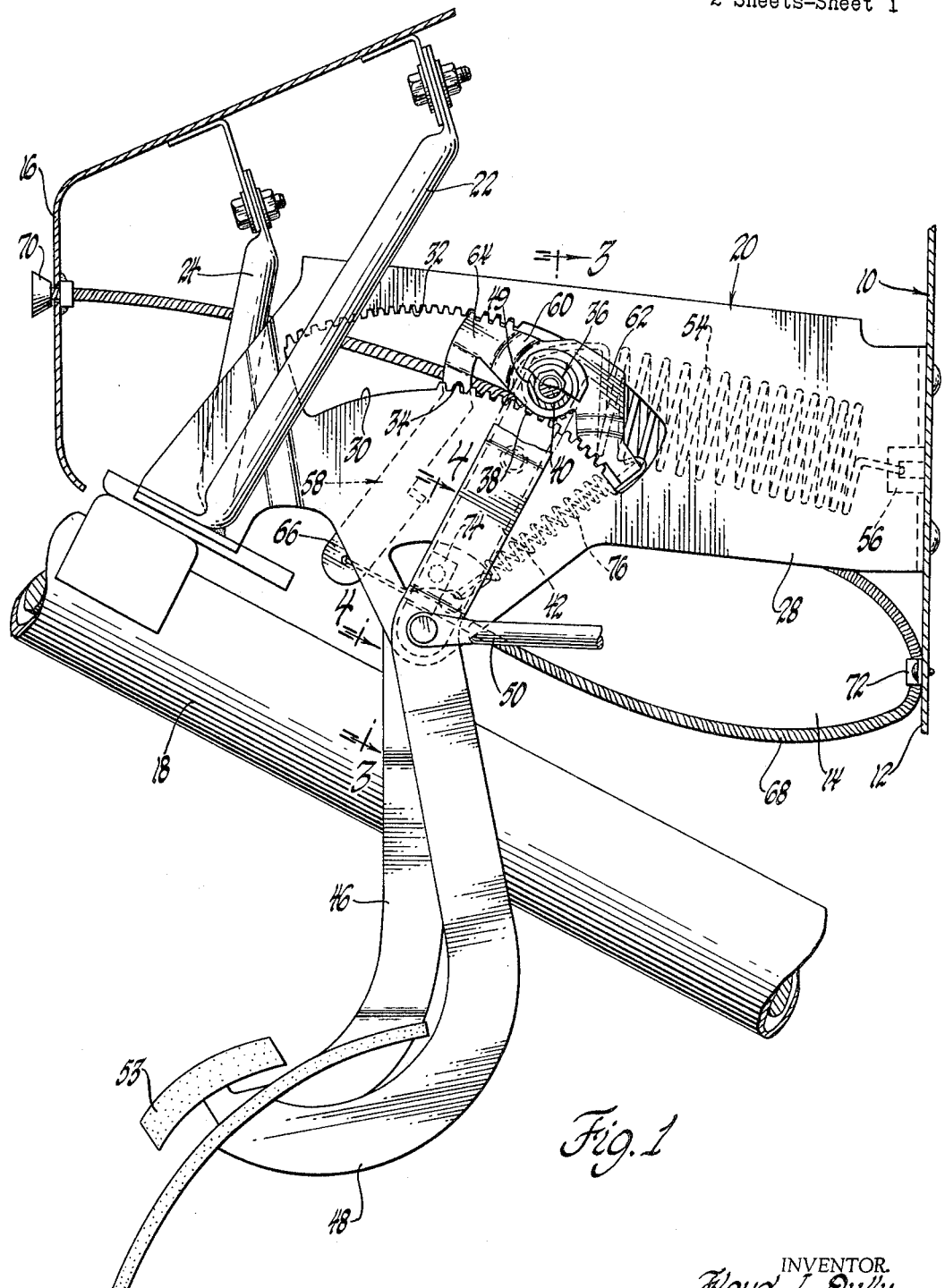
FIGURE 1 is a fragmentary sectional view of a vehicle body embodying control pedals according to this invention.

Referring now particularly to FIGURE 1 of the drawings, a vehicle body designated generally as 10 includes a dash panel 12 separating the forward engine compartment from the passenger compartment 14, and an instrument panel 16 spaced rearwardly of the dash panel. A steering column 18 extends rearwardly and upwardly from dash panel 12, and a passenger seat, not shown, is located in the passenger compartment a sufficient distance from dash panel 12 to provide for adequate leg room for the operator.

As shown best in FIGURES 1 and 2, a generally U-shaped control pedal mounting bracket 20 is bolted or otherwise secured at its forward end to dash panel 12 and is supported at its rearward end by support rods 22 and 24 suspended from hangers on instrument panel 16 and welded to lateral flanges of the bracket. The vertically disposed legs 26 and 28 of the bracket 20 are each provided with an arcuate slot 30 having upper and lower toothed rack portions 32 and 34.

As shown best in FIGURES 2 and 3, a control pedal mounting spindle 36 extends between and through slots 30 and has journaled on each reduced end portion thereof a pinion gear 38 meshing with a respective rack portion 34 to permit controlled movement of the spindle thereover. Spindle 36 further includes a reduced diameter accelerator mounting portion 40. A pair of control links 42 are each pivotally secured at 44 at their lower ends to a respective bracket leg and are each mounted at their upper end on spindle 36 adjacent a gear 38. The center of curvature of slots 30 is located on a transverse line through pivots 44 so that links 42 are free to pivot during any movement of spindle 36 over rack portions 34 and are operative to hold gears 38 in engagement with the rack portions during such movement.

A set of control pedals swingably mounted on spindle 36 includes a brake pedal 46 having a mounting sleeve 47 journaled on flanged bushings on the portion of spindle 36 intermediate the gears 38, and an accelerator pedal 48 having a mounting sleeve 49 journaled on flanged bushings on spindle portion 40. Referring to FIGURES 1 and 2, a throttle control rod 50 is pivotally connected to accelerator pedal 48 intermediate the ends thereof for actuation upon swinging of the pedal about spindle portion 49, and brake control linkage, not shown, is pivotally connected to a lateral mounting stud 52 provided intermediate the ends of brake pedal 46 for actuation of the brake mechanism during swinging movement of the brake pedal about spindle 36 between inoperative and actuated positions.

When the brake pedal 46 is located in the inoperative position shown, the axis of stud 52 is located generally on the line through the center of curvature of slots 30 and pivots 44. It will thus be observed that, taking into account the normal resistance to actuation in the brake mechanism, there is provided a fulcrum at stud 52 for pivotal movement of the brake pedal in a counterclockwise direction, as viewed in FIGURE 1, under forces applied to the operating portion 53 of the pedal, and for the consequent movement of spindle 36 and gears 38 rearwardly of body 10 along rack portions 34. The connection between accelerator pedal 48 and control rod 50 is located generally coaxially of stud 52 so that the accelerator pedal is coordinatively movable with the brake pedal about the fulcrum axis during induced movement of spindle 36. A coil tension spring 54 is hooked at one end thereof over sleeve 47 and at its other end through a rearwardly projecting tab 56 of dash panel 12. Spring 54 resists rearward movement of spindle 36, and as will be hereinafter described, is operable to return the spindle and control pedals in a forward direction for selected adjustment thereof.

As seen best in FIGURE 1, releasable holding means for locating spindle 36 in a selected position relative to rack portions 34 include a generally L-shaped latch member 58 pivoted intermediate the ends of an upper leg 60 thereof on spindle portion 40 adjacent a gear 38. Both the rearward and forward portions of leg 60 are bent slightly inwardly of bracket leg 28 so that a forward toothed portion 62 of the leg 60 is meshingly engageable with rack portion 34 of the bracket leg and a rearward toothed portion 64 is meshingly engageable with rack portion 32 of the bracket leg. The lower leg 66 of the latch member has connected thereto one end of a Bowden wire actuating cable 68, the other end of which is secured to a knob 70 mounted on instrument panel 16. The sheath of cable 68 is secured to dash panel 12 by a clip 72 and further to bracket leg 28 by a clip 74, seen best in FIGURE 4. The cable 68 is operable upon actuation of the knob 70 to pivot the latch member 58 in a counterclockwise direction about spindle 36 from a holding position as shown in FIGURE 1, wherein forward toothed portion 62 engages rack portion 34 and rearward toothed portion 64 engages rack portion 32, to a released position wherein the toothed portions are out of engagement with the respective rack portions to permit movement of spindle 36 and the control pedals relative to bracket 20. A coil tension spring 76, seen best in FIGURE 3, is hooked at one end thereof to a control link 42 and at the other end to a laterally bent portion of leg 60 to bias latch member 58 to its holding position.

It will be apparent that to normally operate the control pedals 46 and 48 to control the vehicle, the latch member 58 is located in holding position to securely locate spindle 36 for swinging movement of the pedals thereabout under forces applied to the lower operating portion of the pedals. When, however, it is desired to adjust pedals 46 and 48 relative to the passenger seat, for example, to a more forward position thereof from that shown in FIGURE 1, latch member 58 is released by cable 68 and the operator then applies forces to operating portion 53 of the brake pedal to pivot the brake pedal, spindle 36 and accelerator pedal about the axis of stud 52 and pivots 44 until the pedals are located in the desired position, whereupon cable 68 is released to permit spring 76 to reenegage latch member 58. If it is desired to adjust the control pedals to a more rearward position, the latch member 58 is released to permit spring 54 to return the pedals and spindle 36 clockwise about the axis of the pivots 44, such return action being controlled if desired by the resistance of the operator's foot on the brake pedal.

Thus new and improved vehicle control pedals are provided.

I claim:
1. In a vehicle body including a mechanism to be operated, the combination comprising, a pedal mounting member mounted on the body, a control pedal including a lever having an operating portion at one end thereof, support means mounted on said mounting member for movement relative thereto, means mounting the other end of said lever on said support means for rotation relative thereto and for movement as a unit therewith relative to said mounting member, connecting means adapted for connection to the mechanism to be operated and further connected to said lever intermediate said ends thereof, said connecting means providing a fulcrum for movement thereabout of said lever and said support means as a unit relative to said mounting member, and cooperating latch means on said support means and said mounting member selectively engageable or releasable to selectively hold or release said support means relative to said mounting member, forces applied to said operating portion while holding said support means stationary relative to said mounting member rotating said lever about said support means to cause said connecting means to operate said mechanism, forces applied to said operating portion while releasing said latch means moving said lever and said support means as a unit relative to said mounting member about the fulcrum provided by said connecting means to permit positional adjustment of said pedal relative to said body.

2. The combination recited in claim 1 wherein said support means includes a shaft rotatably mounting said one end of the lever and rotatably carrying a pinion meshingly engageable with toothed rack means on said mounting member.

3. The combination recited in claim 2 wherein said cooperative latch means includes said rack means and a toothed latch member pivotally mounted on said shaft and engageable with said rack means.

References Cited by the Examiner

UNITED STATES PATENTS

| 1,853,149 | 4/1932 | Rising | 74—512 X |
| 2,071,785 | 2/1937 | Ehrlich. | |
| 2,420,528 | 5/1947 | Eaton et al. | 74—560 X |
| 2,562,974 | 8/1951 | Williams | 74—478 X |
| 2,610,006 | 8/1952 | Boyce | 74—512 X |
| 3,157,063 | 1/1964 | Mussell | 74—512 |
| 3,168,265 | 2/1965 | Pfaff et al. | 74—479 X |
| 3,178,962 | 4/1965 | Peras | 74—513 X |

FOREIGN PATENTS

| 920,725 | 1/1947 | France. |
| 1,165,627 | 6/1958 | France. |

FRED C. MATTERN, Jr., *Primary Examiner.*

BROUGHTON G. DURHAM, *Examiner.*

C. F. GREEN, *Assistant Examiner.*